Dec. 26, 1950     G. V. A. DUCH ET AL     2,535,397
METHOD FOR ELECTRICALLY INTERCONNECTING
WIRES, CABLES, TUBES, PLATES, AND
OTHER METALLIC ELEMENTS

Filed April 5, 1949             2 Sheets-Sheet 1

Inventors:
G. V. A. Duch and
M. A. Duch (neé Banelos)
By E. F. Wenderoth

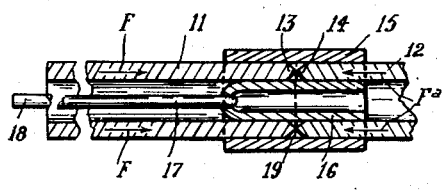
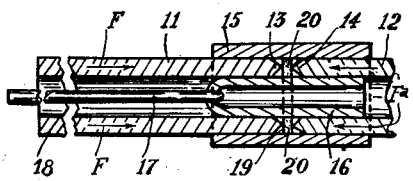
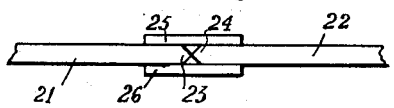
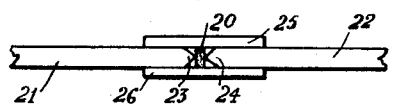
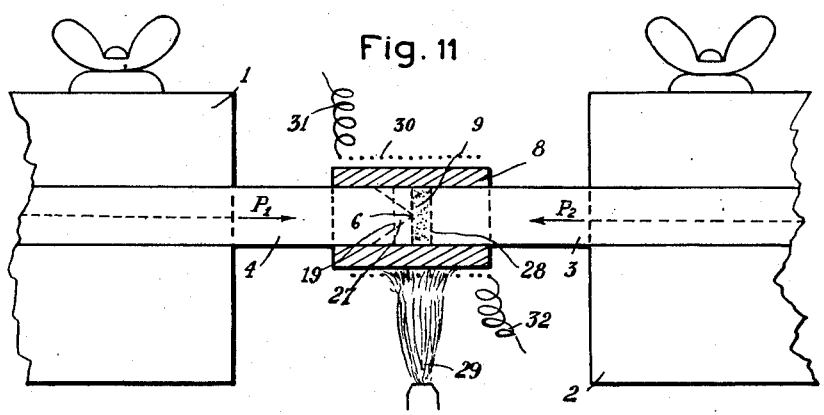
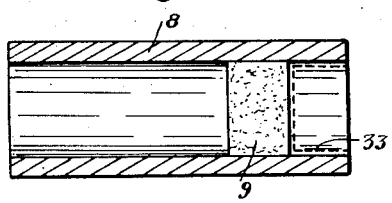
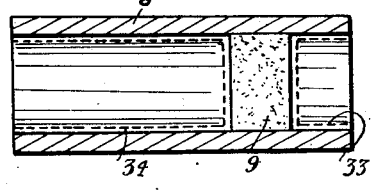
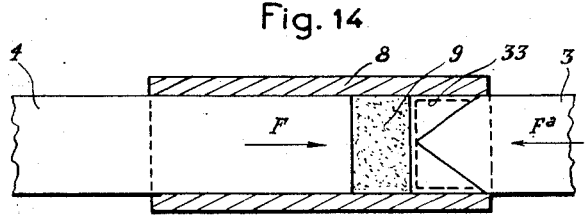

Patented Dec. 26, 1950

2,535,397

UNITED STATES PATENT OFFICE 2,535,397

METHOD FOR ELECTRICALLY INTERCONNECTING WIRES, CABLES, TUBES PLATES, AND OTHER METALLIC ELEMENTS

Gabriel Victor Alphonse Duch and Marie Adrienne Duch, nee Bernelin, Lyons, France Application April 5, 1949, Serial No. 85,602
In France April 8, 1948

3 Claims. (Cl. 219—12)

The present invention relates to a method for electrically interconnecting by butt-welding or by butt-soldering wires, cables, tubes, plates and other metallic elements or parts.

It is a well known fact that electric butt-welding of volatile and oxidizable metals and particularly of aluminum presents considerable difficulties. However the industrial uses of such welding processes are very extensive and the need for welded parts capable of being simply and quickly obtained while possessing a high resistance to tensile stresses is very much felt. It is known for example that electric leads and conductors made of aluminum and subjected, when the current flows through them, to heavy variations of intensity generate heat on the terminals and tappings by means of which they are connected to the circuit. This applies for instance to meter terminals, cut out tappings, contact switch or junction box terminals, etc. The generation of heat on the terminals or tappings is due to the layer of natural alumina which covers the leads or conductors while ensuring their unoxidizableness. This heat generation is localized at the points of insertion of the screws or at the points of engagement of the jaws of the clamps, terminals and tappings. This in the long run may bring about a loosening of the conductors and a disabling of the clamps or terminals, also a pyrogeneration of the insulating materials and eventually a fusion of the leads in the neighborhood of the clamps or terminals. The disadvantages of this phenomenon are obvious. However, such a generation of heat no longer takes place when the conductor or lead tightly held in the clamps or terminal jaws is made of copper, silver or like metal. Unfortunately such conductors or leads made of such noble metals are very expensive and too heavy to enable complete circuits to be entirely constituted thereby. Now it will be understood that the aforesaid disadvantages may be remedied if the conductive lengths made of aluminum and held in the clamps or contact tappings are replaced by elements made of copper, silver or a similar metal or alloy so as to do away with the detrimental heat generation as above referred to. However, this partial replacement of lengths of the leads calls for some form of butt-interconnection which is only practicable if a simple and rapid method of butt-welding or butt-soldering is available and permits the points of interconnection to possess proper resistance to tensile stresses.

It is an object of the invention to provide a method for electrically interconnecting leads or conductors of the aforesaid type by a butt-welding or butt-soldering process.

It is also known that in a large number of industries plates or similar elements made of aluminum or other volatile and/or oxidizable metals require to be interconnected in end to end relation, also that aluminum plates have to be secured endwise upon elements or parts made of another metal, for example copper. This requirement prevails for instance in such industries wherein, say due to reasons of streamlining, it is necessary to provide a strong and perfectly plane end to end interconnection capable of avoiding the limit layers of material from peeling off.

Another object of the invention is to provide a method for butt-welding or butt-soldering plates, tubes or other like elements while permitting the aforesaid result to be obtained.

If an attempt is made to provide such a welded or soldered junction with a current of high voltage and to treat in this manner very volatile or oxidizable metals, for example aluminum, magnesium or their alloys, it is found that when the conductors or the bars to be welded together are brought into contact, a vaporization of the metal in the neighborhood of the contact interface takes place, this vaporization bringing about a molecular repulsion and an immediate oxidization due to contact with the air. This is generally accompanied by a small explosion which expels the particles of molten metal and prevents the liquid molecules from becoming coalesced into welded condition. It is therefore primarily necessary to eliminate for such a welding operation the use of a high voltage current. The use of a low voltage current (of a few volts) offers the advantage of requiring a much smaller power for effecting the welding operations.

The Joule effect due to the flow of current through the conductors to be welded or soldered may be localized adjacent their interface, for example by cutting one of the conductors to a point or bevel shape, say by means of cutting pincers. As the contact surface is then of very reduced area, it will be easily understood that event under a low voltage, a heating effect will be produced which will be capable of melting the metal, provided a current of sufficiently high intensity is employed. However, the end of the conductor then cut along a cross section will then be so flared or swaged as to allow the penetration of said point without nevertheless providing any mechanically acceptable welded or soldered junction. This phenomenon is also accompanied by a small explosion which projects small particles into the surrounding air by vaporization and oxidizes said particles if the metal being used is for example aluminum.

The research work which led to these several observations moreover permitted to discover that it is necessary to protect the welding or soldering zone from the ambient air so as to prevent said projection of particles by vaporization and their concomitant oxidization. Therefore it will also be necessary, assuming the same line of discovery to be followed, to control either manually or by mechanical means that force of application of the conductors against each other which ensures proper penetration of the pointed end into the contacting section of the conductor, also the time during which the current is allowed to flow in order to provide the necessary heating effect. The voltage of the current will also be reduced to such a value as to fuse the conductors without vaporizing them.

The same procedure will have to be followed when dealing with metallic elements having another shape, for example plates, tubes, etc., one of the edges of the elements to be welded or soldered being in such case cut to bevelled shape.

The invention therefore comprises a method for electrically butt-welding or butt-soldering wires, cables, tubes, plates or other metallic elements, particularly those made of highly volatile or oxidizable metals, consisting in cutting to a pointed or bevelled shape at least one of the elements to be welded or soldered together, protecting the extremities of said elements from the access of outer air, and causing a low voltage current to flow through these metallic elements during a proper time while exerting a convenient pressure upon the elements to hold them together.

Advantageously there is provide around the elements to be butt-welded or butt-soldered in the region which covers their extreme portion a protecting or shielding sleeve adaptable to said elements to prevent any contact between them and the outer air. Depending upon the nature of these elements, the sleeve may have the shape of a socket engaged over the conductors or cables or the shape of a double socket applicable to the inner and outer faces of tubular or strip-shaped elements arranged on either sides of the plates to be welded together. Such a protecting sleeve may be made of metal, alloy or refractory material, for example of silica, "Pyrex" glass or like material so as to lend itself to a tearing or breaking stress after completion of the welding.

Advantageously also there is provided between the metallic elements to be interconnected an extraneous metal solder the fusion of which is effected by the heat produced adjacent the contact interface, this extraneous solder welding together the ends of the element.

The heating effect may be accelerated in the neighborhood of the interface by means of a flame or hot fluid jet directed toward the element ends to be welded or by means of an electrical resistor arranged around said ends. In both cases, the heating effect produced by the flow of the current is enhanced by this external heating.

In the accompanying diagrammatic drawings which exemplify the invention and form a part of the present disclosure are shown by way of non-limitative examples suitable constructional embodiments of the device for carrying the present method into industrial practice.

Figures 7 and 8 are sectional views showing how the invention can be put into practice for interconnecting either by butt-welding i. e. autogeneously or by butt-soldering i. e. with extraneous solder a pair of tubular elements.

Figures 9 and 10 are two views showing how a pair of plates may be butt-welded or butt-soldered.

Figure 11 is a view showing a modification utilizing an auxiliary heating source.

Figure 12 is a sectional view drawn to a larger scale of a sleeve containing a disc of extraneous solder utilizable according to a modification of the invention.

Figure 13 is a view similar to Fig. 12 showing a modification of the sleeve.

Figure 14 is a sectional view showing the positions of metallic elements to be butt-soldered through a sleeve as shown in Fig. 12.

Figure 1:
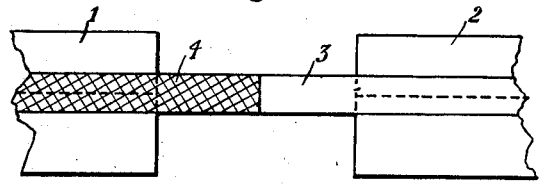
Figure 1 is a view showing the position of two conductors cut along cross sections the ends of which are to be welded or soldered together.

Reference being first had to Fig. 1, a pair of pincers 1, 2 are shown for clamping an aluminum conductor 3 and a copper conductor 4, said conductors being in contact with each other throughout the extent of the interface of their extreme cross section. It will be easily understood that if a current of relatively reduced voltage is caused to flow through these conductors, no particular heating capable of ensuring the welding effect will take place on the interface between their extremities.

Figure 2:
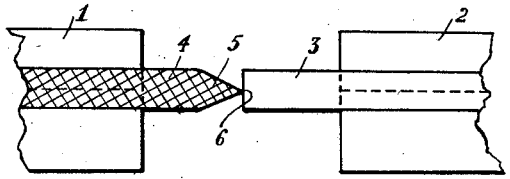
Figures 2 and 3 are views illustrating in a diagrammatic manner the effect of the heating when one of the conductors is cut to pointed shape.
Figure 3:
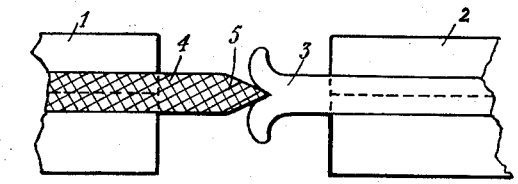

In the showing of Fig. 2, the end portion of the copper conductor 4 is cut to pointed shape as shown as 5 and the interface between these two conductors is then reduced to form the point 6. If an electric current is caused to flow through these conductors, it will be understood that the Joule effect will be localized to said point 6 and will melt the end portion of the aluminum conductor 3 and consequently its flaring or swaging as shown in Fig. 3, this phenomenon being accomplished as above stated by a small explosion jointly with the vaporization of the metal and the projection into the outer air of fine particles of liquid metal. In the case of aluminum, which is considered here, an oxidization of the extreme end portion takes place moreover, all these phenomena cooperating for constituting a hindrance against the obtention of mechanically acceptable welded or soldered junctions.

Figure 4:
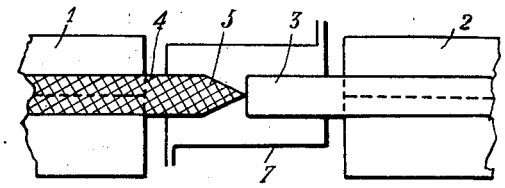
Figure 4 shows how the welding zone can be protected from the contact of the outer air so as to preclude oxidization.

According to the showing of Fig. 4, there is provided before switching on the current and around the extreme end portion of the conductors an enclosure 7 into which said conductors are introduced under gentle friction. An inert gas is caused to pass through this enclosure; said gas prevents the contact of outer air and of the end portions of the conductors to be welded. When a current of relatively low voltage and of high intensity flows a heating effect takes place at the interface between the aluminum conductor and the copper point 5 which melts the metal.

The liquid aluminum particles can no longer be oxidized by the outer air and cannot be projected outwards because of the presence of the enclosure 7. This results in an attraction of the metal particles and in an interpenetration which ensures an efficacious welding or soldering.

Obviously both end portions of the conductors to be welded together should be juxtaposed while welding and the current must be caused to flow during the time just necessary for its completion. However the enclosure 7 must be disengaged or destroyed after each welding operation which makes this process an expensive proposition. This disadvantage may be remedied by providing a simple protecting sleeve as will be described hereafter.

Figure 5:
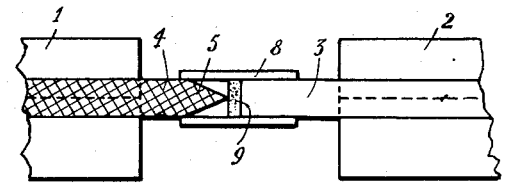
Figure 5 is a view showing how the invention may be carried into industrial practice.

The autogeneous welding obtained as stated with reference to Fig. 4 may be, moreover, transformed into soldering with extraneous solder material, for example tin, as shown in Fig. 5. It will be understood that the term "extraneous solder material" does not simply mean a metal but also involves any suitable extraneous alloy. Thus in the case of aluminum-copper junctions, tin or any tin-bearing alloy may be used. In this case, a sleeve 8 adjusted to the extreme end portions of the conductors and into which said conductors are introduced under gentle friction is substituted for the enclosure 7. It will be noticed that a solder disc 9 is interposed between the copper point 5 and the aluminum conductor 3, a pickling material being applied to the copper point 5 so as to secure the primary fusion tin. As the current flows, the fusion of this extraneous solder material assists the soldering. Obviously the provision of the sleeve on the conductors does not need to be air-tight, the tightness being obtained in any suitable way by the expansion of air at the time of the heating during the soldering process.

Figure 6:
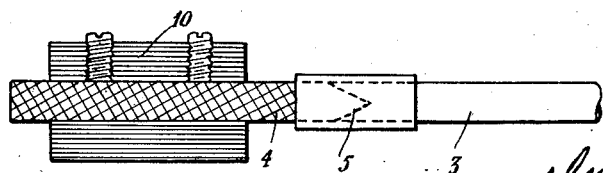
Figure 6 is a view showing a method of putting the invention into practice.

The junction obtained in that way between the two conductors 3 and 4 is diagrammatically shown in Fig. 6 in which the contact point (made for example of copper) is represented in dotted lines, the soldering zone thus formed corresponding to an interpenetration of the particles of both metals. The copper conductor 4 is shown gripped by a contact pincer 10. As above stated, the contact obtained on said copper conductor will be satisfactory and most of the circuit may be constituted by aluminum wires 3. The foregoing considerations apply in the same way in the case of autogeneously interconnecting by welding or soldering two metals of any kind. It is then sufficient in the foregoing explanations to take their contact without any alloying with the extraneous solder material into account.

The sleeve 8 constituting the protecting enclosure permitting the completion of the welding or soldering action may be made of metal and may remain on the welded or soldered part of the conductors also for example of fire-proof material, pottery or the like which may be broken off as soon as the welding or soldering operation is completed to permit the separation of the sleeve. There will then simply remain two butt-welded or butt-soldered conductors assembled strongly. This sleeve may be also withdrawn by opening along one of its generatrices, then by tearing it away from the welded or soldered conductors.

The voltage utilized for this operation will be preferably comprised in a range from a fraction of volt to three volts, in order to obtain a mere fusion of the metal and by no means a vaporization of the same, while the intensities of the current utilized for this welding or soldering operation may vary from one to several hundred amperes per square millimeter of cross sectional area according to the nature of the metals.

In the case of tubes, the method according to the invention is carried out as shown in Figs. 7 and 8. A pair of tubes 11 and 12 are assumed to have to be butt-welded. The end portions of these tubes are cut to bevelled shape as shown at 13 and 14. An outer sleeve 15 is then applied to the outer face of the tubes on each side of their interface, the bevelled parts 13 and 14 of the tubes being approximately in the middle of the sleeve. An inner socket is then introduced into the tubes 11, 12 under gentle friction, having rigidly fixed to it a rod 18 permitting this socket to be brought to a suitable position inside the sleeve 15. As shown in Figs. 7 and 8, the length of the rod 18 will be so chosen as to project from the end portion of one of the tubes, for permitting the introduction and disengagement of the socket 16.

Reference being now had more particularly to Fig. 7, when a low voltage electric current of high intensity is caused to flow through the tubular conductors 11, 12, a heating effect takes place by Joule effect on the interface between the bevelled portions or edges 13, 14 which will melt the metal. If a stress F is exerted rightward on the tube 11, when viewing the drawing and another stress $F^a$ is exerted in the opposite direction on the tube 12 or if one of these stresses is replaced by a fixed point resistance, the molten end portions of the tubes 11, 12 will interpenetrate each other to achieve along the theoretical interface 19 a mechanically acceptable welded junction.

In the case shown in Fig. 8, there is interposed between the edges 13, 14 an extraneous metal disc 20 the fusion of which will take place at the same time as the fusion of the end portions of the tubes and which will cooperate to their soldering. This soldering action is then basically completed along the interface 19 between the edge 13 of the tube 11 and the extraneous metal disc 20.

In the showing of Figs. 9 and 10 is illustrated the application of the invention to the butt-welding of plates 21, 22. In this case, the edges of the plates to be welded together are cut to bevelled shape as shown at 23, 24 and are brought into contact by applying on each side strips 25, 26 covering the abutted end portions of said plates. The current is then allowed to flow while exerting on the plates 21, 22 stresses directed toward each other so as to complete the welding action as above stated and to obtain, according to Fig. 9, an autogeneous welding and, according to Fig. 10, a soldering with extraneous metal.

In an alternative form of the method according to the invention, the heating effect in the neighborhood of the interface between the end portions of both conductors or metallic elements to be welded together is facilitated by means of an outer heating action, for example as shown in Fig. 11.

In order to facilitate the welding of an aluminum conductor 3 with a copper conductor 4 both being gripped by pincers 1, 2 the end portions 27, 28 of which are housed in a protective sleeve 8, with the interposition of a solder disc 9 made of a tin alloy or tin between the edge 28 of the aluminum conductor and the point 27 provided at the end portion of the copper conductor 4 to ensure the soldering action along a theoretical section 19, the sleeve 8 is heated by means of a flame 29 during the flow of the electric soldering current, while exerting on the conductors 3, 4 stresses $P_1$ and $P_2$ directed toward each other. A fixed abutment is substituted if desired for one of these stresses. It will be easily understood that the additional heat provided by the flame 29 will supplement the heating of the extreme end portions of the conductors and consequently the completion of the welding process.

According to a further alternative form of putting the method into practice, an electric resistor 30 fed by leads 31, 32 is arranged around the sleeve 8 and the current is caused to flow through this resistor at the same time as through the conductors 3, 4 so as to obtain an additional heat for facilitating the fusion of the metals and consequently their welding together.

In order to facilitate the carrying of the method into practice for welding together posts, tubes or similar elements, sleeves prepared before-hand may be utilized. In order to obtain a soldering effect with extraneous metal, the metal or alloy solder disc may be for example tightly fixed by compression into the sleeve at a suitable distance from its base, and the inner face of said sleeve may then be covered with a suitable pickling material, for example in the form of a varnish. It thus becomes possible to provide before-hand a series of sleeves of different shapes or configurations or gages according to the welding or soldering operations which have to be completed.

In the showing of Fig. 12 is illustrated a sleeve of this type generally designated by 8 and containing an extraneous metal or alloy disc 9 fixed under pressure in said sleeve. A pickling varnish 33 is applied to one side only of the solder disc 9 and to one part only of the inner face of the sleeve.

In the alternative form shown in Fig. 13, a sleeve 8 is utilized containing an extraneous metal or alloy disc 9 on both sides of which is applied a pickling varnish 33, 34 which then covers both faces of this disc and the entire inner face of the sleeve 8.

The sleeves utilized for that purpose and provided with pickling varnishes may be of every suitable type and made for example of brass, iron, nickel, fire-proof material (silica, "Pyrex" glass or the like). etc.

For the use of a sleeve 8 of this type, the same is push fitted (as shown in Fig. 14) to the end portion of a conductor or similar metallic element 4 in order to bring the extreme edge of the same into contact with the solder disc 9, whereafter the other metallic element 3 to be welded is introduced into the other side of the sleeve, said element 3 being for example point-shaped and penetrating into the portion of the sleeve 8 covered with the pickling varnish 33. It is then sufficient to cause the current to flow through these metallic elements while exerting on each element a stress F, $F^a$ directed toward the sleeve to ensure the welding operation.

It will be seen from the foregoing that the objects of the invention are attained by the method as above described, said method permitting welded or soldered junctions to be readily obtained electrically between wires, cables, tubes, plates and other metallic elements or parts.

Minor constructional details of the ways in which the improved method can be carried out may be varied without departing from the scope of the subjoined claims.

What is claimed is:

1. A method for electrically butt-soldering copper and aluminum conductors comprising the steps of cutting the end portion of one conductor so as to provide a reduced contact interface, interposing between said end portion and the end portion of the other conductor a disc of tin solder, maintaining said end portions in contact with said disc, protecting said disc and the end portions of said conductors from the influence of outer air, and causing a low voltage electric current of high intensity to flow through said disc and said conductors during a time sufficient to bring about a coalescence along said interface while holding said disc and said conductors together under pressure, so as to form a copper-tin-aluminum ternary alloy in the soldering zone.

2. A method for electrically butt-soldering copper and aluminum conductors comprising the steps of cutting the end portions of the conductors so as to provide a reduced contact interface, interposing between said cut ends a disc of tin solder, maintaining said cut ends in contact with said disc, protecting said disc and the end portions of said conductors from the influence of outer air, and causing a low voltage electric current of high intensity to flow through said disc and said conductors during a time sufficient to bring about a coalescence along said interface while holding said disc and said conductors together under pressure so as to form in the soldering zone a copper-tin-aluminum ternary alloy.

3. A method for electrically butt-soldering copper and aluminum conductors comprising the steps of cutting the end portions of the conductors so as to provide a reduced contact interface, interposing between said conductors a disc of tin solder, applying over said end portions and said disc a refractory protective sleeve snugly fitting over said portions so as to protect them from the influence of the outer air, said sleeve being so chosen as to be breakable and splittable after the soldering step, and causing a low voltage electric current of high intensity to flow through said disc and said conductors during a time sufficient to bring about a coalescence along said interface while holding said disc and said conductors together under pressure, so as to form in the soldering zone a copper-tin-aluminum ternary alloy.

GABRIEL VICTOR ALPHONSE DUCH.
MARIE ADRIENNE DUCH, née BERNELIN.

REFERENCES CITED

The following references are of record in the file of this patent:

UNITED STATES PATENTS

| Number | Name | Date |
|---|---|---|
| 347,142 | Thomson | Aug. 10, 1886 |
| 1,679,701 | Wysong | Aug. 7, 1928 |
| 2,276,643 | Bates | Mar. 17, 1942 |
| 2,298,999 | Allen | Oct. 13, 1942 |
| 2,301,899 | McBain | Nov. 10, 1942 |
| 2,414,463 | Gunn et al. | Jan. 21, 1947 |

FOREIGN PATENTS

| Number | Country | Date |
|---|---|---|
| 113,837 | Great Britain | Mar. 8, 1918 |
| 887,702 | France | Aug. 16, 1943 |

OTHER REFERENCES

Bulletin No. 12-A, 1943, pages 16 and 17. Handy and Harman, 82 Fulton Street, New York, New York.